United States Patent Office 3,214,046
Patented Oct. 26, 1965

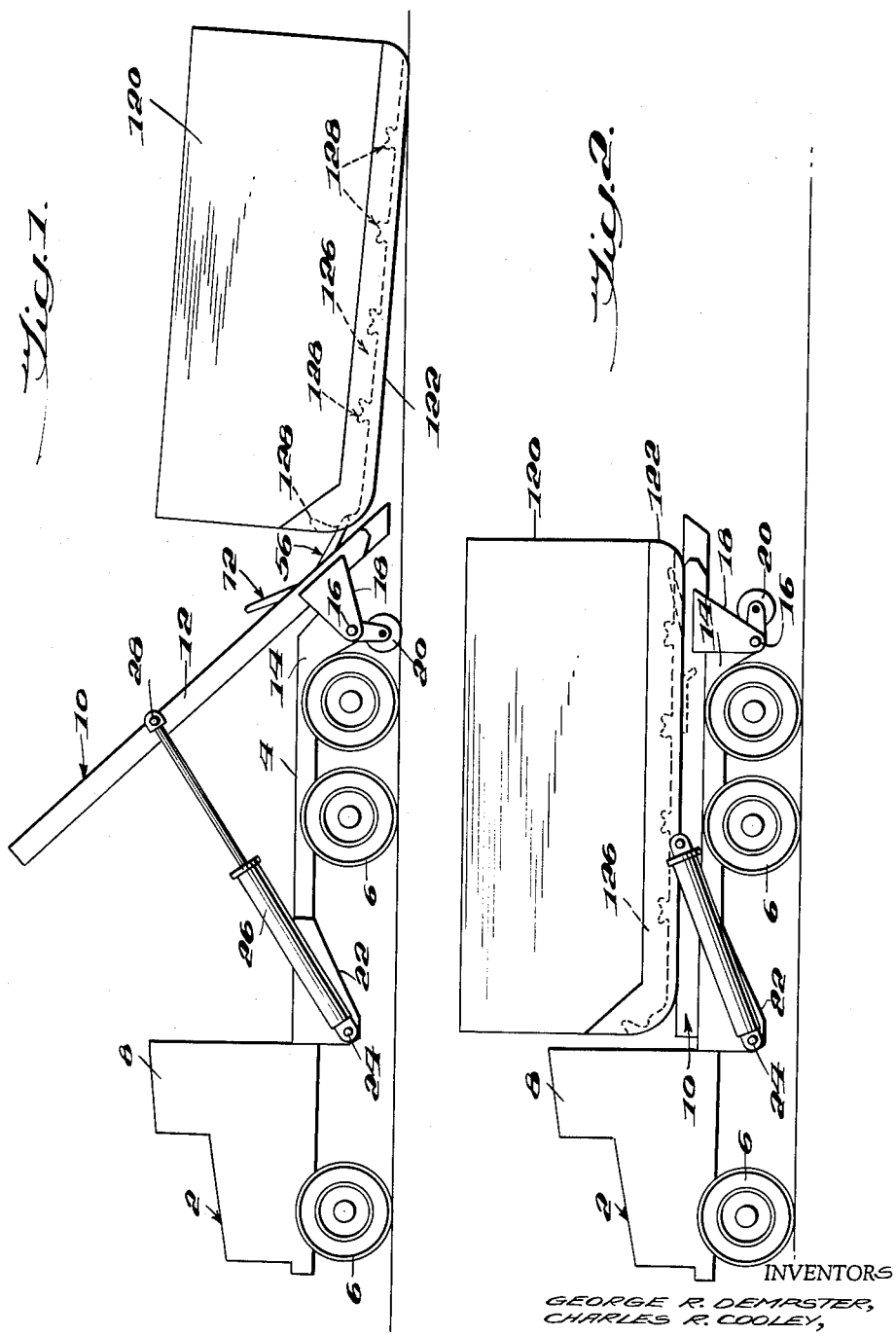

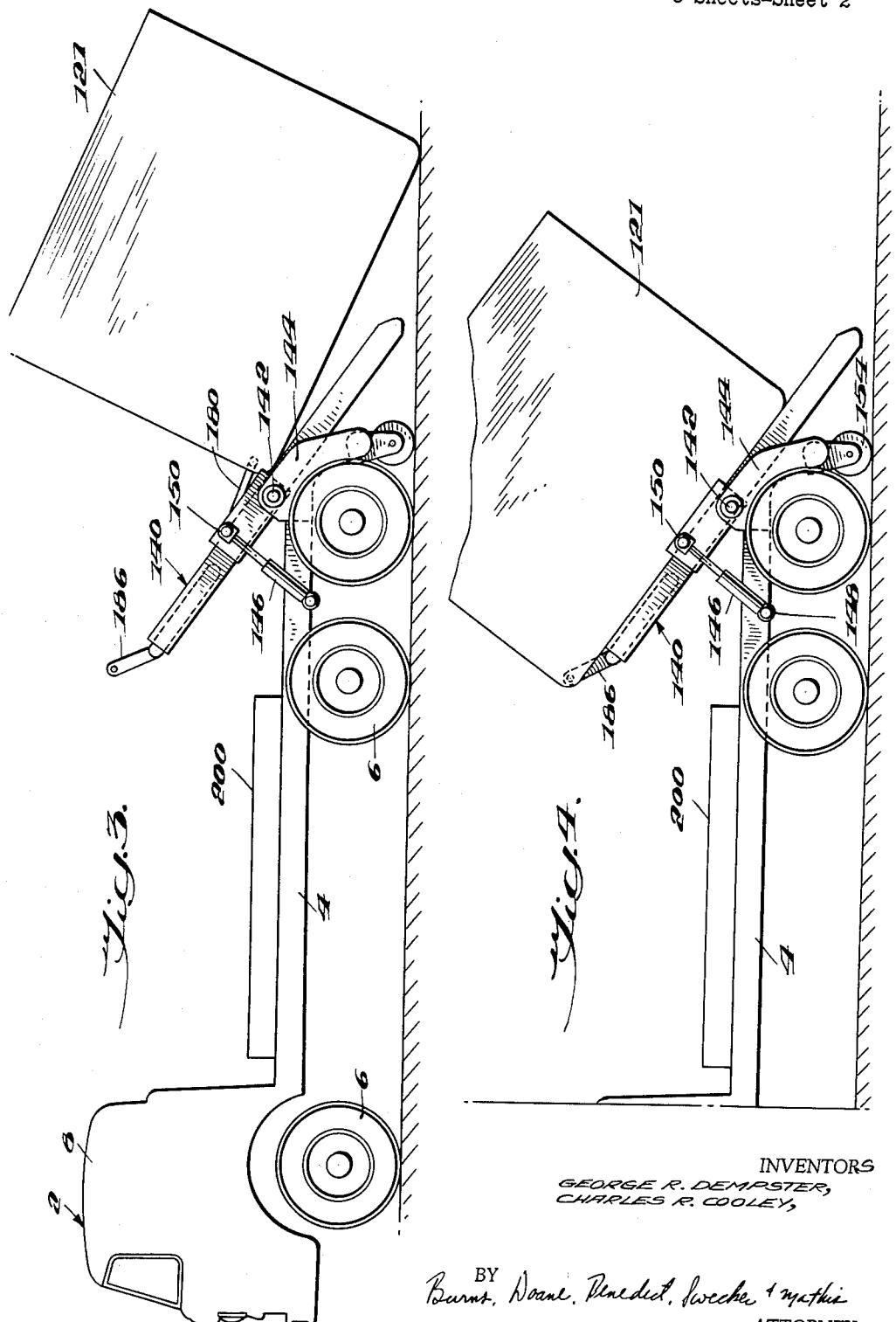

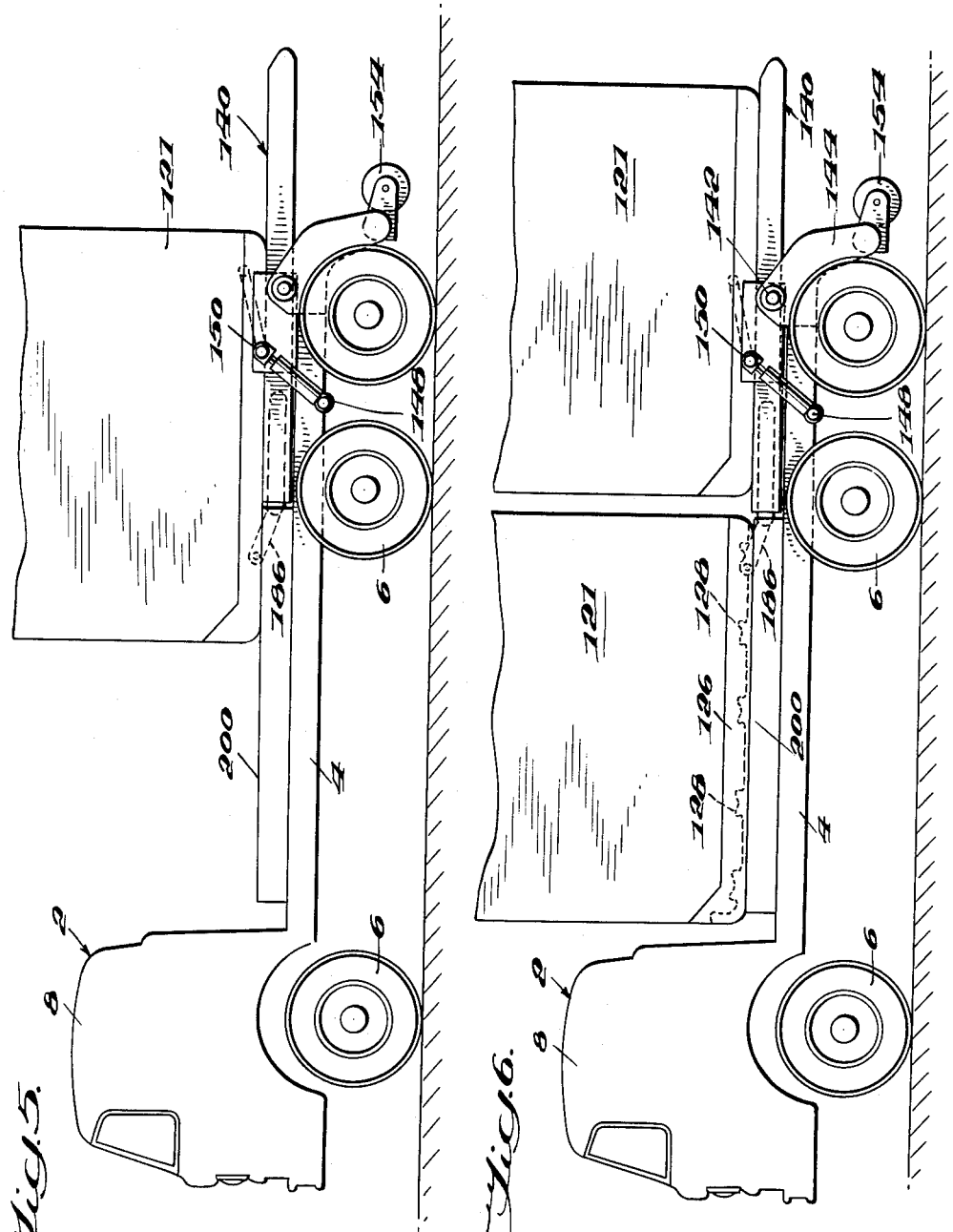

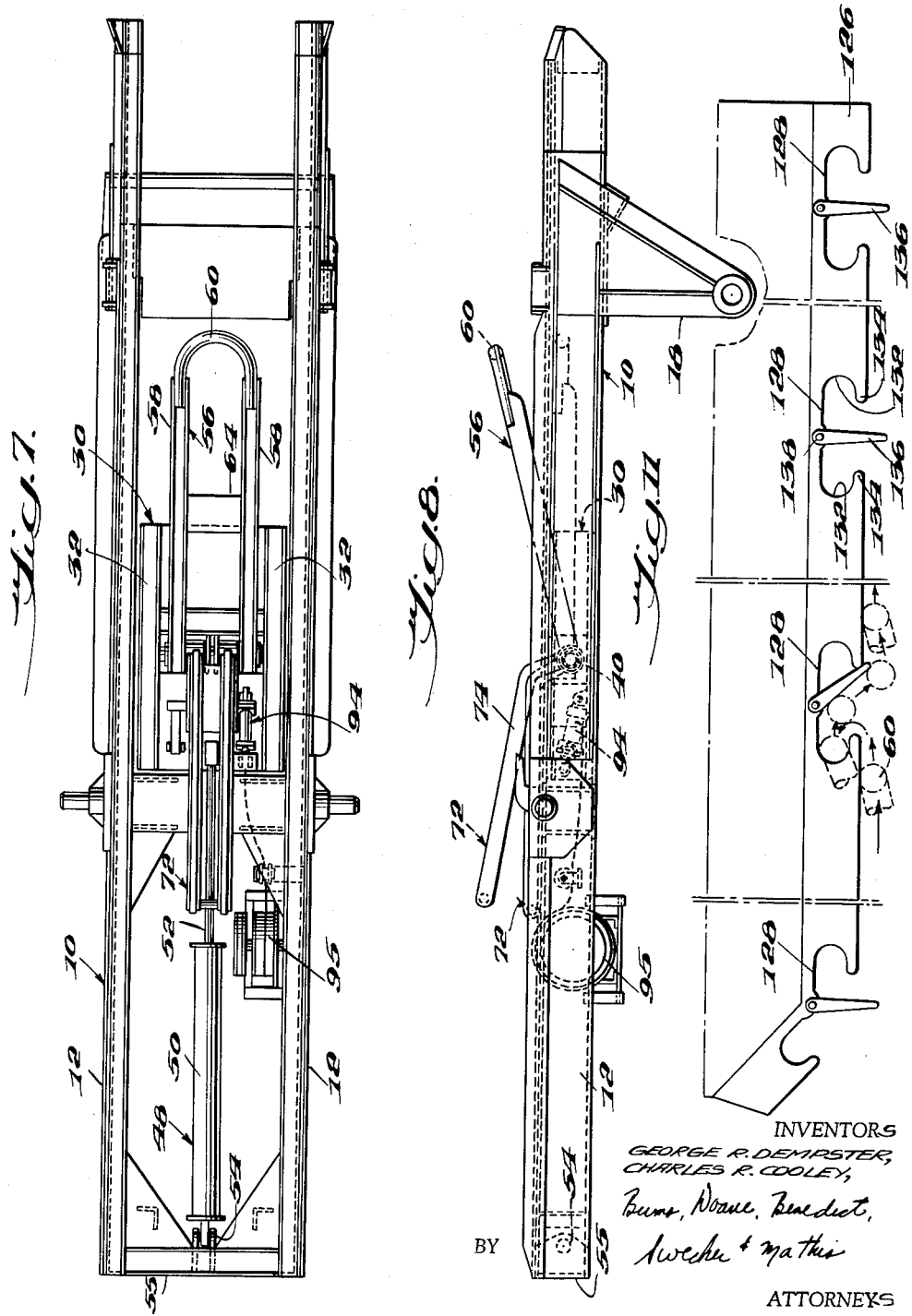

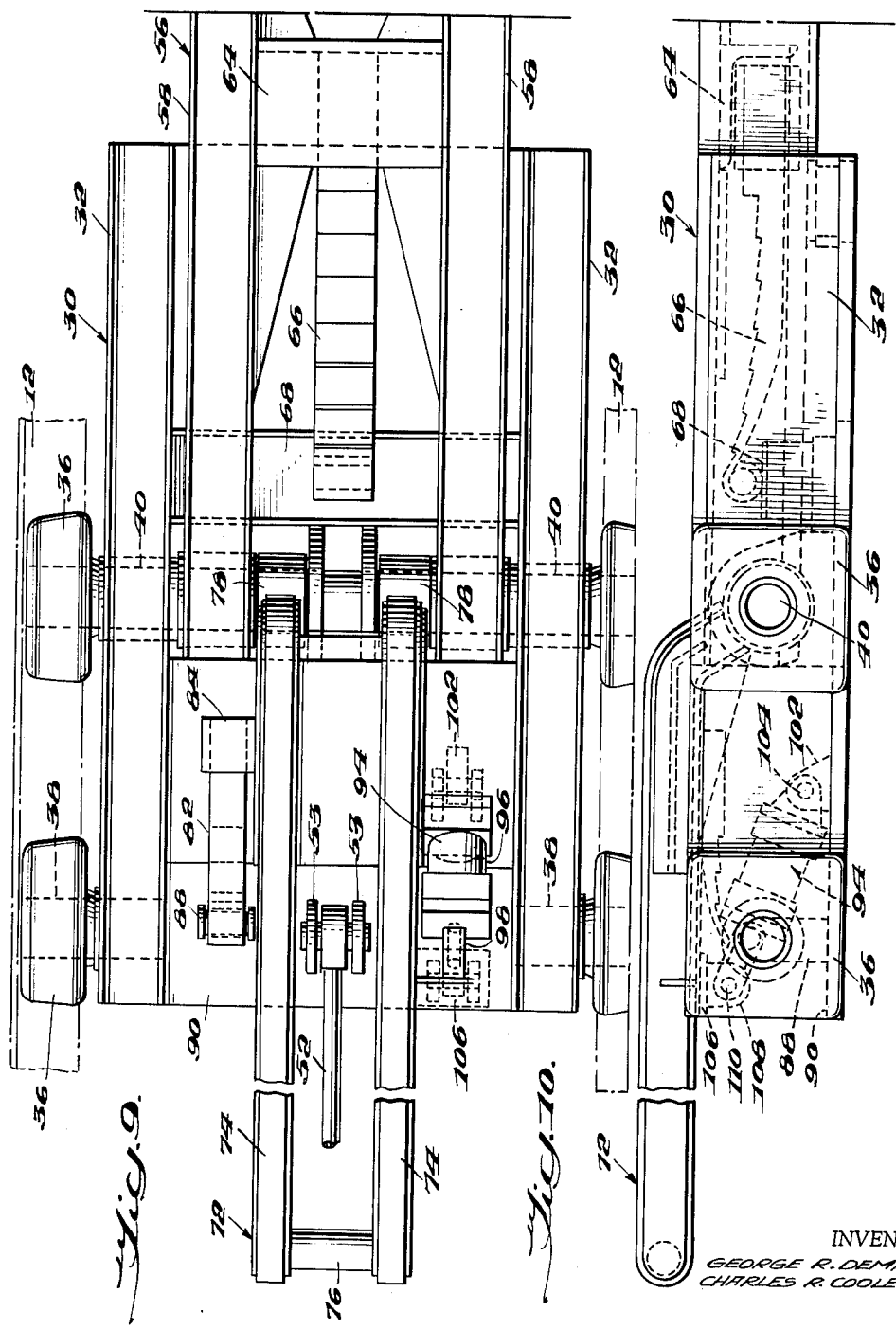

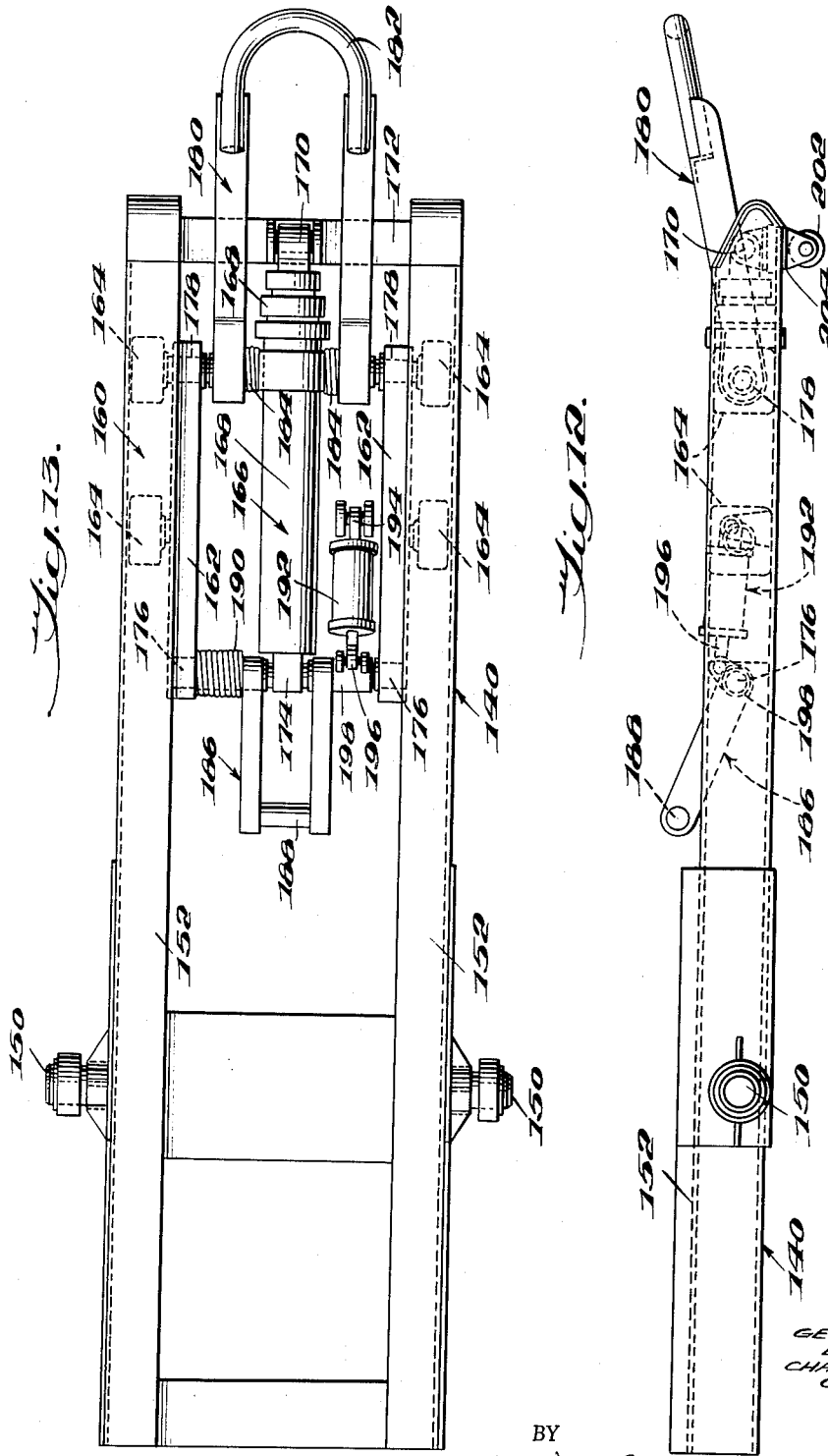

3,214,046
CONTAINER HANDLING MECHANISM
George R. Dempster, Knoxville, Tenn.; Trust Company of Georgia, executor of said George R. Dempster, deceased, and Charles R. Cooley, Knoxville, Tenn.; said Cooley assignor to Dempster Brothers, Inc., Knoxville, Tenn., a corporation of Tennessee
Filed Aug. 31, 1962, Ser. No. 220,607
7 Claims. (Cl. 214—505)

This application discloses and claims subject matter disclosed in part in prior application Serial No. 744,107, filed June 24, 1958, now Patent No. 3,144,149, granted August 11, 1964, and Serial No. 14,313, filed March 11, 1960, now Patent No. 3,130,847, granted April 28, 1964.

This invention relates to improvements in container handling mechanism of the type used for loading or unloading one or more large size containers with respect to a transporting vehicle.

In the handling of materials of various types, containers as large as a standard vehicle body, or sometimes about one-half that size, often are employed. These containers are filled when resting on the ground, or other supporting surface, and then loaded onto a vehicle and transported to a distant point where they are unloaded from the vehicle or the contents discharged therefrom. If the containers remain on the vehicle, they may be returned to the location of filling or to a new location and placed on the ground again for refilling.

At times, these containers may be transferred between a transporting vehicle and a raised platform, such as a railway car or a loading dock. In this instance, the platform is at substantially the same height as the chassis of the vehicle and the force of gravity cannot be used in moving the containers. The mechanism for loading and unloading large size containers, therefore, must be capable of pulling the containers onto the vehicle, and must also be capable of pushing the containers off of the vehicle.

In the handling of these large size containers, it is necessary to have power actuated mechanism, and it has been found desirable to mount the mechanism directly upon a transport vehicle. When a large size container is to be transferred between said raised platform and a vehicle the mechanism must be able to move the container without the aid of gravity. On the other hand, when a large sige container is to be moved between a vehicle and the ground, for example, the mechanism must be capable of lifting the container from the ground onto the vehicle, or be capable of setting the container on the ground from the vehicle with a minimum of jarring and tilting of the container.

Previous types of mechanism for loading and unloading large size containers with respect to vehicles have used cable-type devices, but these have not been entirely satisfactory. A cable-type mechanism is not satisfactory for unloading a large container from a vehicle when it is necessary to move the container onto a platform which is substantially the same height as the vehicle chassis. Furthermore, cable-type devices do not afford adequate control over the movement of the containers and generally allow a transporting vehicle to accommodate only one container at a time. Additionally, cable-type devices usually require operator to leave the cab to attach the cable to or unlatch the cable from the container. Not infrequently cables break; and, therefore, they are inherently dangerous.

One object of this invention is to provide improved mechanism for loading or unloading one or more detachable bodies or large size containers with respect to a vehicle.

Another object of this invention is to provide power mechanism for pulling one or more large size detachable bodies onto a vehicle and for pushing such bodies off of a vehicle.

Another object of this invention is to provide improved mechanism for loading and unloading a detachable body or large size container with respect to a vehicle whereby the operator can control the movement of the body or container without leaving the cab of the vehicle.

Another object of this invention is to provide improved mechanism for loading and unloading a detachable body or large size container with respect to a vehicle whereby the operator has full control over the movement of the body or container during the loading and unloading operations.

Another object of this invention is to provide mechanism for transferring a detachable body or large size container with respect to a vehicle wherein the body or container can be transferred between the vehicle and a raised platform, or can be transferred between the vehicle and the ground or other supporting surface at a level below the chassis of the vehicle.

These objects may be accomplished generally by providing on a transporting vehicle a tipping frame pivotally mounted on the rear of the vehicle and swingable to raised and lowered positions with respect thereto. Connecting mechanism is mounted on and movable along the tipping frame and is adapted to be detachably connected with a separable body or large size container for pulling or pushing the body or container onto or off of the tipping frame. Suitable power devices are provided for raising and lowering the tipping frame and for operating the connecting mechanism in a reciprocating manner.

The connecting mechanism of this invention includes a carriage assembly movable along and guided by the tipping frame and propelled by a power device extending between the carriage and the tipping frame. A rear bail member, having a transversely positioned loop portion, extends to the rear of the carriage assembly and is biased by a spring to extend above the top surface of the bail assembly. A front bail member having a loop portion is pivotally mounted on the carriage assembly and is moved to a raised position or to a lowered, inoperative position with respect to the carriage assembly by means of a power device. The loop portion of either the rear bail member or the front bail member can be engaged with one of a series of hook stations on a hook bar extending along the detachable bodies or large size containers adapted to be loaded or unloaded with respect to the vehicle.

In one embodiment of the invention, the tipping frame is of such length to extend generally throughout the length of the vehicle chassis behind the cab and can accommodate detachable bodies or large size containers generally the size of a conventional vehicle body. In addition, small size containers can be handled by this full length tipping frame. In another embodiment of the invention a short tipping frame is provided and extends over only a portion of the rear of the vehicle chassis. A container support section or bed is provided on the chassis behind the cab of the vehicle in alignment with the short tipping frame for receiving and supporting a small size container.

These embodiments of the invention are illustrated in the accompanying drawings, in which:

FIG. 1 is a side elevation view of a vehicle having a full length tipping frame mounted thereon, with the frame raised and the connecting mechanism engaging a separable body or container;

FIG. 2 is a similar side elevation view of a full length tipping frame in lowered position with a container loaded onto the vehicle;

FIG. 3 is a side elevation view of a vehicle of modified construction having a short tipping frame mounted thereon, with the tipping frame raised and the connecting mechanism engaging a separable body or container;

FIGS. 4, 5 and 6 are similar side elevation views showing various steps in the loading of a first and second container onto the vehicle of FIG. 3;

FIG. 7 is an enlarged plan view of a full length tipping frame of FIG. 1 and a connecting mechanism used therewith;

FIG. 8 is a side elevation view corresponding with FIG. 7;

FIG. 9 is a fragmentary plan view of a portion of a tipping frame showing in detail the connecting mechanism;

FIG. 10 is a side elevation view of the connecting mechanism of FIG. 9;

FIG. 11 is a fragmentary elevation view of a hook bar provided on the detachable bodies or containers to be accommodated by the container handling mechanism;

FIG. 12 is an enlarged side elevation view of a short tipping frame of FIG. 3; and FIG. 13 is a plan view corresponding with FIG. 12.

The container handling mechanism of this invention may be applied to a conventional motor vehicle 2 having a chassis 4 supported by suitable wheel and axle assemblies 6. The vehicle may be power driven in the usual manner under control of an operator located within a cab 8. The chassis frame 4 should be of sufficient length to receive thereon and to accommodate a large size separable body or container generally the same size as a conventional truck body. If desired, the chassis frame may be that of a conventional trailer separate from the tractor portion thereof, although functioning otherwise in a manner as described.

As illustrated in FIGS. 1 and 2, the vehicle chassis 4 has a full length tipping frame 10 mounted thereon and extending longitudinally of the vehicle and vertically over the chassis. The tipping frame 10 includes a pair of spaced-apart side members 12 on opposite sides of the tipping frame substantially at opposite sides of the chassis and together preferably forming a guideway. The side members 12 may be provided with guideways, such as channels, along the inner faces thereof. The members 12 are suitably braced and spaced apart by intermediate connecting members which cooperate to form a unitary structure for receiving thereon the containers to be accommodated. A full length tipping frame 10 is illustrated in detail in FIGS. 7 and 8.

At the rear of the chassis 4 and at each lateral side there is a depending bracket 14. A pivot shaft 16 extends between, and is supported by, the brackets 14. At the rear of the tipping frame 10 and at each lateral side there is a depending bracket 18 mounted upon and supported by the pivot shaft 16. The tipping frame 10, in this manner, is pivotally mounted with respect to the chassis 4 for swinging movement relative thereto to raised positions and to lowered positions as illustrated in FIGS. 1 and 2, respectively.

The rear of the vehicle 2 may be provided with a stabilizing jack if needed for accommodating abnormally heavy loads. One form of jack, as shown in FIGS. 1 and 2, includes a roller 20 mounted on the pivot shaft 16 for raising and lowering movements with respect thereto under control of a suitable power device. In FIG. 1, the roller 20 is shown in a lowered position for supporting the rear of the vehicle, and in FIG. 2 the roller is shown in a raised or inoperative position. Reference may be made to application Serial No. 811,657, filed May 7, 1959, now Patent No. 3,107,021, granted October 15, 1963, wherein such a roller is described in detail.

Behind the cab 8, the opposite sides of the chassis 4 are provided with depending brackets 22 welded or otherwise secured rigidly thereto. The brackets 22 support a cross shaft 24 which is journaled in bearings secured to the brackets 22. The shaft 24 projects laterally a short distance beyond the outside faces of the brackets 22, and mounted on these outer projecting ends of the shaft 24 are the lower ends of hydraulic power devices 26, the upper ends of which are pivotally connected at 28 with opposite sides of the tipping frame 10. Each hydraulic power device 26 may be of any suitable or desired form and many include a cylinder and piston rod assembly capable of telescoping movement in raising and lowering the tipping frame 10 relative to the chassis 4.

The channel members 12 of the tipping frame 10 form oposed trackways receiving therebetween a carriage assembly 30 (FIGS. 7–10). The carriage assembly 30 includes a pair of longitudinal, channel-shaped side members 32 spaced apart and located in relatively close relation to the inner faces of the side members 12. These side members 32 are held in spaced relation and braced by suitable cross members.

Located on the side members 32 and extending laterally therefrom are mounting members 36 which may be in the form of rollers if desired, although slides or other suitable means may be employed such as the block-shaped members shown. These mounting members 36 form bearing supports within the guide members 12 for supporting and guiding the carriage 30 lengthwise of the tipping frame 10. The front mounting members 36 are connected to the side members 32 by stub shafts 38, and the rear mounting members 36 are connected by a transversely extending shaft 40.

The carriage 30 is propelled back and forth longitudinally of the tipping frame 10 by means of a power device 48 which may include a conventional hydraulic cylinder 50 and piston rod 52 capable of expanding and contracting movements for pushing or pulling the carriage 30 lengthwise of the tilting frame 10. The rod 52 of the power device 48 is connected at its rear to brackets 53 which are made rigid with the carriage assembly 30. The cylinder 50 has its forward end connected at 54 to a suitable cross member 55 of the tilting frame 10.

The carriage assembly is provided with a rear container hook device or bail 56 having side members 58 and a loop section 60. The front portions of the side members 58 are pivotally mounted on the shaft 40. The side members 58 extend rearwardly of the carriage 30 and can swing vertically to extend above the top surface of the carriage 30 and the tipping frame 10, or can swing to a lowered position wherein the entire bail lies between the channel members 12 of the tipping frame 10.

The bail side members 58 are held in spaced-apart relationship by a spacer bar 64. A leaf spring 66 is fastened at one end to the lower surface of the spacer bar 64 and extends forwardly where it bears upon a cross member 68 connecting the side members 32 of the carriage 30. The leaf spring 66 imparts a force to the intermediate portion of the bail 56 which tends to hold the bail in an elevated position relative to the carriage 30, as illustrated in FIG. 8.

A reversed container hook device or front bail 72 extends forwardly of the carriage 30 from the shaft 40 and is comprised of spaced-apart parallel side members 74 connected at their forward ends by a cross pin 76. The rear ends of the side members 74 are attached to sleeve members 78 which are journalled on the shaft 40. The front bail 72 can swing in a vertical direction to a raised position so that the bail 72 extends above the top surface of the tilting frame 10, or to a lowered position wherein the side members 74 are positioned between and generally below the members 12 of the tipping frame 10.

A leaf spring assembly 82 is attached at its rearward end to a plate 84 which in turn is fastened to one of the side members 74. A shackle-type assembly 88 connects the forward end of the leaf spring 82 to a cross bar 90 which extends transversely of the carriage 30. The leaf spring 82 tends to force the front bail 72 to its raised position as shown in FIG. 8.

A power device 94 is located adjacent the front bail 72 opposite the leaf spring 82 and may be a conventional hydraulically actuated device including a cylinder 96 and a piston rod 98. The rear end of the cylinder 96 is pivotally mounted on the cross bar 90 of the carriage assembly 30 by an upwardly extending small plate 102 and a cross pin 104. The free end of the piston rod 98 is pivotally mounted on one of the side members of the front bail 72 by a small plate 106 secured to one of the side members 74 and having a pair of depending small plates 108 and a cross pin 110. The power device 94 may be actuated against the force of the leaf spring assembly 82 to pull the front bail 72 downwardly to its lowered position, as illustrated in FIGS. 8 and 10. A hose reel assembly 95 is mounted on the tipping frame 10 for holding a hose (not shown) which runs between a source of fluid pressure on the chassis and the power device 94. The reel is spring loaded to automatically reel-in the hose.

The detachable bodies or containers 120, used in connection with the vehicle 2 and the loading mechanism described, are illustrated in FIGS. 1 and 2. Smaller size containers 121, generally one-half the size of the container 120, are shown in FIGS. 3–6. The handling mechanism may accommodate containers 120 as large as a conventional truck body, or small size container 121, generally one-half the size of a conventional truck body, may be accommodated instead. Except for the longitudinal dimension of the container, they may be generally of any suitable size and type as desired. For example, they may have open or a closed top and have various combinations of lids, doors and tailgates. In addition to box-shaped containers, various other arrangements for handling materials may be provided such as, different kinds of cargo containers, stake bodies, platforms, tanks, etc.

Each container 120, for example, is provided with a subframe structure which includes a pair of beams 122 spaced-apart a distance corresponding with the width of the side members 12 of the tipping frame 10. These beams 122 form runners for supporting the container 120 upon the tipping frame or upon the ground, or other supporting surface. The forward ends of the beams 122 are curved upwardly in the form of bows to facilitate the guiding of the container 120 onto the tipping frame. Suitable braces and ribs may be employed as necessary to strengthen the subframe struction.

Extending lengthwise of each container, intermediate the beams 122, is a hook bar 126 which extends preferably throughout the length of the container. The hook bar 126 is provided with a plurality of hook stations 128 spaced along the length of the hook bar 126 for engagement with the loop portion 60 of the rear bail 56 or the cross pin 76 of the front bail 72. The number and spacing of the hook stations 128 may vary depending upon the length of the container and the length of travel of each stroke of the carriage assembly 30. A hook bar which may be used with the container is illustrated in FIG. 11.

Each hook station 128 is formed with a pair of opposed hook surfaces 132 opening downwardly with lips 134 in position to be overlapped alternately by a shuttle member 136. The shuttle member 136 is pivoted at 138 on the hook bar 126 for swinging movement, but normally hangs downwardly between the opposed hook surfaces 132.

By proper actuation of the power device 48, the operator can move the carriage assembly 30 and thus allow the bail portion 60 or the cross pin 76 to engage either the rear hook surface or the forward hook surface 132 of any hook station 128. The shuttle 136 allows the bail portion 60 or the pin 76 to move past the hook station 128 without engaging either hook surface 132. However, upon a slight reverse movement of the carriage assembly 30, the loop portion 60 or the pin 76 will move the shuttle away from the corresponding lip 134 and slide easily into contact with a hook surface 132 as can be visualized from the series of positions of the loop portion 60 shown in FIG. 11.

In picking up or loading a container 120, the vehicle is backed up to the front end portion of the container while it is resting upon the ground, or other supporting surface, so that the rear of the vehicle is at or in close proximity to the front end of the container. Then, upon actuation of the cylinders 26, the tipping frame 10 can be moved to an upwardly inclined or raised position, as shown in FIG. 1.

If the stabilizing jack is used, the roller 20 may be swung into engagement with the ground. This will aid in supporting the load on the tipping frame 10 during the pulling of the container onto the vehicle.

With the tipping frame 10 raised, the operator then actuates the power device 48 to move the carriage assembly 30 to the lower end of the tipping frame 10. The rear bail 56 normally is in a raised position with respect to the carriage assembly 30, as shown in FIG. 8. The bail portion 60 will be projected below the lower end of the inclined tipping frame 10 and beneath the forward end portion of the container 120.

If the vehicle and the container 120 are properly aligned, the bail portion 60 will enter a forward hook station 128 of the hook bar 126. By action of the leaf spring 66, the bail 56 normally will be urged in an upward direction to be elevated sufficiently high so as to slide into a hook station 128. The angle of the tipping frame 10 may be varied under control of the operator by proper manipulation of the power devices 26 so as to cause the bail portion 60 to make proper entry into one of the forward hook stations 128.

After hook engagement with the container in this manner, the operator may then actuate the power device 48 to move the carriage assembly 30 toward the front of the vehicle through a full stroke of the power device 48 or through a partial stroke, if desired. This will pull the container 120 onto the tipping frame 10. Thereafter, the carriage assembly 30 and the bail 56 can be moved rearwardly so that the loop portion 60 of the bail 56 will engage an intermediate or a rear hook station 128. Upon forward movement of the carriage assembly again, the container 120 will be pulled further onto the tipping frame 10. As the container 120 is pulled onto the tipping frame 10, the beams 122 slide along the upper surface of the guide members 12 of the tipping frame. During the loading of the container, the operator may lower the tipping frame by proper manipulation of the power devices 26.

Because of the position of the power device 48 between the front of the tipping frame 10 and the rear of the carriage assembly 30, the forward movement of the bail 56 is limited to a location usually not farther than the midportion of the tipping frame 10. If a large size container is being loaded onto the tipping frame, this limited forward movement of the bail 56 is sufficient to move the container completely onto the tipping frame, as illustrated in FIG. 2. However, if a short or small size container is to be moved onto the vehicle, it is desirable that the container be moved to a position immediately behind the cab 8. Normally, the bail 56 could not move a short container to this extreme forward position.

The front bail member 72 is used to move a short or small size container onto the front portion of the tipping frame after the short container has been pulled onto the tilting frame by the bail 56 in the manner just described. By proper manipulation of the power device 48 and by using the front bail 72, the cross pin 76 can be caused to enter one of the hook stations 128 to establish a connection between the carriage assembly 30 and a short container 121, shown in FIGS. 3–6. The carriage assembly 30 can be pulled toward the front of the tipping frame 10 and by use of the front bail assembly 72 it will move a short container 121 from the midportion of the tipping frame 10 to the front of the tipping frame immediately behind the cab 8.

When a large size container is handled by the loading and unloading mechanism, the front bail 72 ordinarily will not be used and the power device 94 is actuated to pull the bail 72 to its lowered position where it will not be able to become engaged with any hook station on a container. When the front bail 72 is used, fluid pressure is relieved from the power device 94 and the bail 72 is subject to the force of the spring 82.

In order to unload or discharge a container from the vehicle, the loading operation is reversed. If a short or small size container has been moved onto the tipping frame at the front thereof, first the front bail 72 is used to engage one of the rear hook stations 128 on the container. By actuation of the power device 48, the carriage assembly 30 can be moved to the rear of the tipping frame in order to pull the short container to the midportion of the tipping frame. After the short container has been moved far enough toward the rear of the tipping frame, the bail 56 will be in position to engage one of the rear hook stations 128 on the container and to complete the removal of the container from the vehicle by operation of the power device 48.

The tipping frame 10 can be varied in its angle of incline with respect to the horizontal in order to facilitate the unloading of the container if the container is to be set on the ground or other supporting surface at a level below the level of the tipping frame. Because the carriage assembly 30 is propelled alternately toward the front and toward the rear of the tipping frame 10, a container can be transferred between the vehicle and a raised platform such as a railway car or a loading dock which is at substantially the same level as the tipping frame. In this event, the tipping frame does not have to be elevated, or elevated only slightly.

In order to facilitate the handling of two small size containers 121 on a single vehicle, a short tipping frame 140, instead of a full length tipping frame, may be used, as shown in FIGS. 3–6. The short tipping frame 140 is pivotally mounted at 142 on brackets 144 fixed on the chassis 4. As illustrated in FIGS. 3–6, the pivots 142 are located above the chassis 4 of the vehicle and generally at the mid portion of the short tipping frame 140. The rear of the frame 140 is thereby positioned and proportioned to swing close to the ground behind the vehicle. Power devices 146 have one end pivotally connected at 148 to the chassis 4 and the other end pivotally connected at 150 to channel-shaped side members 152 of the short tipping frame 140. The power devices 146 can be actuated to swing the tipping frame between a lowered position shown in FIGS. 5 and 6 and a raised position shown in FIGS. 3 and 4, 12 and 13. A stabilizing jack device having a roller 154 may be mounted on the lower ends of the brackets 144 for supporting the rear of the vehicle during loading or unloading.

A carriage assembly 160 (FIGS. 12 and 13) having side members 162 is mounted on the short tipping frame 140 by mounting members 164 which fit within the channel-shaped members 152 and slide therealong lengthwise of the tipping frame 140. A power device 166 which includes telescoping sections 168 has one end connected at 170 to a rear cross member 172 of the tipping frame 140 and has the other end connected at 174 to a shaft 176 which extends between the side members 162 of the carriage assembly 160. The power device 166 can be extended or retracted to propel the carriage assembly 160 in guided reciprocating fashion along the short tipping frame 140.

A pair of aligned shafts 178 extend between the rear of the side members 162 and the power device 166 and have the rear mounting members 164 mounted on outwardly protruding ends thereof. A rear hook device or bail 180 having a loop portion 182 is pivotally mounted on the shafts 178 and is biased to a raised position by torsion springs 184 surrounding the shafts 178 wherein the loop portion 182 extends above the top surface of the carriage assembly 160 and the top surface of the tipping frame 140. The rear bail 180 extends to the rear of the carriage assembly 160 and functions generally in the same manner as the rear bail 56.

A front hook device or bail 186 having a cross pin 188 is pivotally mounted on the shaft 176 and is biased to a raised position forwardly of the carriage assembly 160 by a torsion spring 190. A power device 192 has one end connected at 194 to the carriage assembly 160 and has the other end connected at 196 to a sleeve 198 fixed to the bail 186 and surrounding the shaft 176. The power device 192 can be actuated to swing the front bail 186 downwardly to an inoperative position. The front bail 186 functions generally in the same manner as the front bail member 72.

Between the short tipping frame 140 and the cab 8, a bed or platform 200 is fixed on the chassis 4 for receiving and supporting a small size container 121. Each container 121 is provided with a hook bar 126 so that the carriage assembly 160 can engage the container and load or unload it with respect to the vehicle 2.

The loading operation of two small size containers 121 is shown in FIGS. 3–6. A first container 121 is pulled onto the raised short tipping frame 140 in step-by-step fashion through reciprocating operation of the carriage assembly 160 and engagement of the rear bail 180 with various hook stations 128 on the container, as shown in FIGS. 3 and 4. The front bail 186 is made operative by relieving fluid pressure from the power device 192 and upon reciprocating operation of the carriage assembly 160, the front bail 186 engages various hook stations 128 on the first container 121 to push the container 121 onto the bed 200 after the tipping frame 140 has been lowered by proper actuation of the power devices 146, as shown in FIG. 5. Continued operation of the carriage assembly 160 can be effected to push the first container 121 completely onto the bed 200, as shown in FIG. 6. Thereafter, the loading operation can be carried out in connection with a second small size container 121 to load the container onto the tipping frame 140 for transportation.

A roller 202 (FIG. 12) connected to the rearward, lower end of the short tipping frame 140 by brackets 204 to extend downwardly therefrom, may be used to support the rearward end of the tipping frame on the ground during a loading or unloading operation.

The container handling mechanisms described can be actuated under the control of an operator located within the cab 8 and without the need for the operator to leave the cab. If desired, suitable controls can be placed on the outside of the vehicle. Throughout an entire loading or unloading operation the operator has complete control over movement of a container. Because of the carriage assembly and tipping frame arrangement, a variety of different types of containers can be handled. The containers are not jarred or tipped substantially, and the material therein is not likely to be spilled or damaged.

While the invention has been described and illustrated in certain preferred embodiments, it is recognized that

We claim:

1. In mechanism of the character described for loading and unloading a container with respect to a vehicle, the combination of movable carriage means for pulling or pushing a container onto or off of the vehicle, means for guiding the carriage means along the vehicle, and power means for propelling the carriage means in either direction along the guiding means, said carriage means including a first bail member having means forming a pivotal connection to the carriage means and with said first bail member extending in one direction from the pivotal connection, means for biasing the first bail member into position for engagement with a container, and a second bail member pivotally connected to the carriage and extending in the opposite direction from the pivotal connection and being selectively engageable with a container, and means for moving the second bail member to a retracted inoperative position during movement of the container in one direction by the first bail member and thereafter moving the second bail member into engagement with the container and moving the container thereby in the same direction a further distance along the vehicle.

2. In mechanism of the character described for loading and unloading a container with respect to a vehicle, the combination of a tipping frame adapted to be pivotally mounted with respect to the rear of a vehicle chassis for swinging movements to raised and lowered positions, said tipping frame being adapted to receive a container thereon, movable carriage means for pulling or pushing a container onto or off of the tipping frame, means for guiding the carriage means along the tipping frame, and power means for propelling the carriage means in either direction along the tipping frame, said carriage means including a first bail member having means forming a pivotal connection to the carriage means and with said first bail member extending rearwardly from the pivotal connection, means for biasing the first bail member into position for engagement with a container, a second bail member pivotally connected to the carriage and extending forwardly from the pivotal connection, means for selectively biasing the second bail member into position for engagement with a container, and means for retracting the second bail member out of engagement position during operation of the first bail member, and means for moving the second bail member to a retracted inoperative position during movement of the container in one direction by the first bail member and thereafter moving the second bail member into engagement with the container and moving the container thereby in the same direction a further distance along the vehicle.

3. In mechanism of the character described for loading and unloading a container with respect to a vehicle, the combination of movable carriage means for pulling or pushing a container onto or off of the vehicle, means for guiding the carriage means along the vehicle, and power means for propelling the carriage means in either direction along the guiding means, said carriage means including a first bail member having means forming a pivotal connection to the carriage means and with said first bail member extending in one direction from the pivotal connection, means for biasing the first bail member into position for engagement with a container for moving the container in one direction relative to the vehicle, a second bail member pivotally connected to the carriage and extending in the opposite direction from the pivotal connection, means for biasing the second bail member into position for engagement with a container, and means for moving and holding the second bail member in an inoperative position during movement of the container by the first bail member in said one direction and thereafter moving the second bail member into engagement with the container and moving the container thereby in the same direction a further distance relative to the vehicle.

4. In mechanism of the character described for loading and unloading a container with respect to a vehicle, the combination of movable carriage means for pulling or pushing a container onto or off of the vehicle, means for guiding the carriage means along the vehicle, and power means for propelling the carriage means in either direction along the guiding means, said carriage means including side members, a shaft extending between the side member transversely of the guiding means, a first bail member having one end pivoted about the shaft and the other end extending rearwardly of the side members, and a second bail member having one end pivoted about the shaft and the other end extending forwardly of the side members, and means for moving the second bail member to a retracted inoperative position during movement of the container in one direction by the first bail member and thereafter moving the second bail member into engagement with the container and moving the container thereby in the same direction a further distance along the vehicle.

5. In container loading and unloading mechanism, the combination of a frame adapted for movement of a container therealong and having a trackway, a movable carriage having side members, means connected with the side members and mounting the carriage on the trackway, a shaft extending transversely between the side members, a hook device mounted at one end on the shaft and extending lengthwise of the carriage in one direction therefrom, a second shaft mounted on the carriage and spaced from the first-mentioned shaft, a second hook device mounted on the second shaft and extending therefrom in the opposite direction from the first-mentioned hook device, each of said hook devices having means for engaging the container to move said container upon operation of the carriage, means for raising the hook devices to engaging positions, a power cylinder operatively connected with one of the hook devices for moving said hook device to a retracted position during operation of the container by the other hook device, and a cylinder device connected with the second-mentioned shaft and with the frame for moving the carriage relative thereto, said first hook device moving the container in one direction along the frame while the second hook device is held in an inoperative position by the power cylinder and thereafter the container is moved by the second hook device in the same direction relative to the frame.

6. The combination with a vehicle having a chassis, a bed on the chassis for receiving a container, and a frame pivotally mounted on the chassis for swinging movement to a position substantially in alignment with the bed, of a container having support means thereon in guided relation with the frame and bed and for supporting the container thereon, a device mounted on the frame for operative movement relative thereto, a first hook member carried by said device having means for detachable hook connections with the container to pull the container along the frame, a second hook member carried by said device having means for detachable hook connection with the container to push said container along the frame and onto the bed, and power means for retracting the second hook member during movement of the container by the first hook member.

7. The combination with a vehicle having a chassis, a frame mounted on the chassis and having a guideway, of a container having support means thereon in guided relation with the frame guide means and supporting the container thereon, a device mounted on the frame for operative movement relative thereto, a first hook member carried by said device having means for detachable hook connection with the container, and a second hook member carried by the device having means for detachable hook connection with the container, said container being movable a distance longitudinally with respect to the frame in one direction by the first hook member while the second hook member is held in an inoperative retracted position after which the second hook member engages the container and moves it in the same direction a further distance along the frame.

References Cited by the Examiner

UNITED STATES PATENTS

| | | | |
|---|---|---|---|
| 1,821,327 | 9/31 | Scott | 214—38.22 X |
| 1,869,046 | 7/32 | Buck. | |
| 1,877,193 | 9/32 | Norton. | |
| 1,896,063 | 2/33 | Bottini. | |
| 1,910,398 | 5/33 | Ludington | 214—516 |
| 2,266,791 | 12/41 | Norbom | 214—516 |
| 2,521,727 | 9/50 | Kappen | 214—84 X |
| 2,591,153 | 4/52 | Hodges | 214—516 |
| 2,633,809 | 4/53 | Robinson et al. | |
| 2,867,339 | 1/59 | Nelson | 214—504 X |
| 2,900,922 | 8/59 | Edmonds | 104—162 |
| 2,963,185 | 12/60 | Jones et al. | 214—505 |
| 3,107,020 | 10/63 | Dempster | 214—505 |
| 3,130,847 | 4/64 | Dempster et al. | 214—505 |

HUGO O. SCHULZ, *Primary Examiner.*

GERALD M. FORLENZA, *Examiner.*